T. G. REDINGTON.
MACHINE FOR FILLING AND CAPPING BOTTLES.
APPLICATION FILED MAY 18, 1907.

931,649.

Patented Aug. 17, 1909.
7 SHEETS—SHEET 2.

WITNESSES:
William J. Miller
Edward Wiesner

INVENTOR
Thomas G. Redington
BY
W. C. Hauff
ATTORNEY

T. G. REDINGTON.
MACHINE FOR FILLING AND CAPPING BOTTLES.
APPLICATION FILED MAY 18, 1907.

931,649.

Patented Aug. 17, 1909.
7 SHEETS—SHEET 3.

WITNESSES:
William Miller
Edward Wiesner

INVENTOR
Thomas G. Redington
BY
W. C. Hauff
ATTORNEY

T. G. REDINGTON.
MACHINE FOR FILLING AND CAPPING BOTTLES.
APPLICATION FILED MAY 18, 1907.

931,649.

Patented Aug. 17, 1909.
7 SHEETS—SHEET 4.

WITNESSES:
William Miller
Edward Wiesner

INVENTOR
Thomas G. Redington
BY
W. C. Hauff
ATTORNEY

T. G. REDINGTON.
MACHINE FOR FILLING AND CAPPING BOTTLES.
APPLICATION FILED MAY 18, 1907.

931,649.

Patented Aug. 17, 1909.
7 SHEETS—SHEET 5.

WITNESSES:
William Miller
Edward Wiesner

INVENTOR
Thomas G. Redington
BY
W. C. Hauff
ATTORNEY

UNITED STATES PATENT OFFICE.

THOMAS G. REDINGTON, OF NEW YORK, N. Y., ASSIGNOR OF ONE-HALF TO GUSTAVE H. GRIMM, OF RUTLAND, VERMONT.

MACHINE FOR FILLING AND CAPPING BOTTLES.

No. 931,649.　　　　Specification of Letters Patent.　　　Patented Aug. 17, 1909.

Application filed May 18, 1907. Serial No. 374,433.

*To all whom it may concern:*

Be it known that I, THOMAS G. REDINGTON, a citizen of the United States, residing at New York, in the county of New York and State of New York, have invented new and useful Improvements in Machines for Filling and Capping Bottles, of which the following is a specification.

By means of this invention bottles can be automatically emptied of gas or air, charged or filled with liquid or beverage, and capped or closed.

The machine shown is of the kind called rotary although the invention is not necessarily confined to such machines.

The invention is set forth in the following specification and claims and illustrated in the annexed drawing in which—

Figure 16:
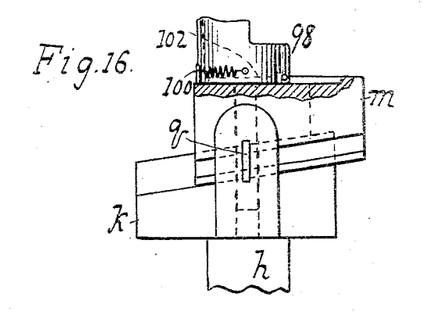
Fig. 16 is a side elevation of Fig. 15.
Figure 17:
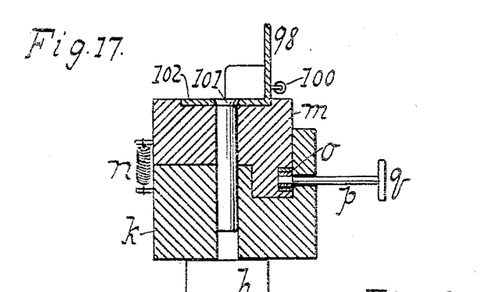
Fig. 17 is a sectional view of Fig. 16.
Figure 18:
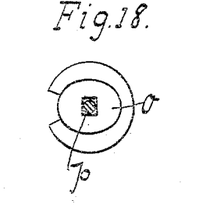
Fig. 18 shows a table lock.

In this drawing (Fig. 1) is shown a frame or support $a$ and a stationary column $b$. A driving shaft $c$ (Fig. 1) by suitable gearing or miter wheels actuates a vertical shaft $d$ which meshes into a gear ring or wheel $e$ rotating a table or rather a series of brackets $f$. Each bracket $f$ has integrally formed therewith a support $f^1$ at its upper portion for holding the filling heads which will be more fully hereinafter explained, and also with a lower combined bearing projection and guide $f^2$ forming a table. Secured to the column is an inclined way $g$ and in the combined bearing projections and guides $f^2$ are sliding rods or plungers $h$ which as the series of brackets rotate are caused to rise as they are carried to a higher part of way $g$. Returning springs $i$ cause the plungers to be lowered as they are carried to a lower part of the way. These plungers each carry a foot $k$ on the inclined upper face of which rests a bottle table $m$ (Fig. 16) whose lower face is inclined as is the upper face of foot $k$. When the part $m$ is slid one way or another on part $k$ the bottle is raised or lowered. A returning spring or springs $n$ tends to return these parts to a starting point and a clamp or eccentric $o$ Fig. 17 can lock the parts when adjusted. The clamp or eccentric $o$ can be surrounded by an expanding ring if seen fit to protect the material of sliding table $m$. The clamp has a stem $p$ with cross piece $q$ and as the rotary brackets $f$ carry the cross piece $q$ to one or another of the trips $r$ Figs. 1 and 3 the clamp is turned to lock or free the parts $k$ $m$ with respect to one another. The trips being at different levels will engage opposite end portions of cross piece $q$ to lock or unlock.

Figure 2:
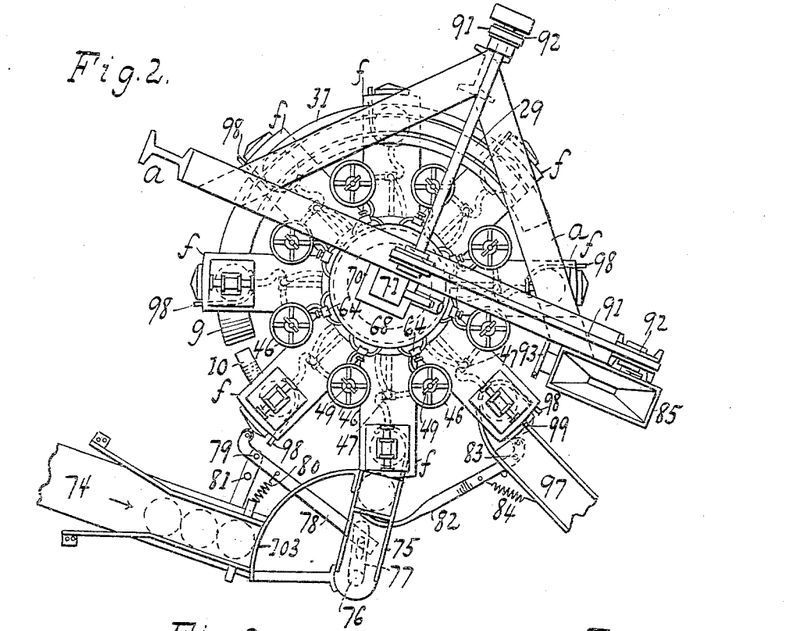
Fig. 2 is a plan view of Fig. 1.
Figures 3, 4, 5:
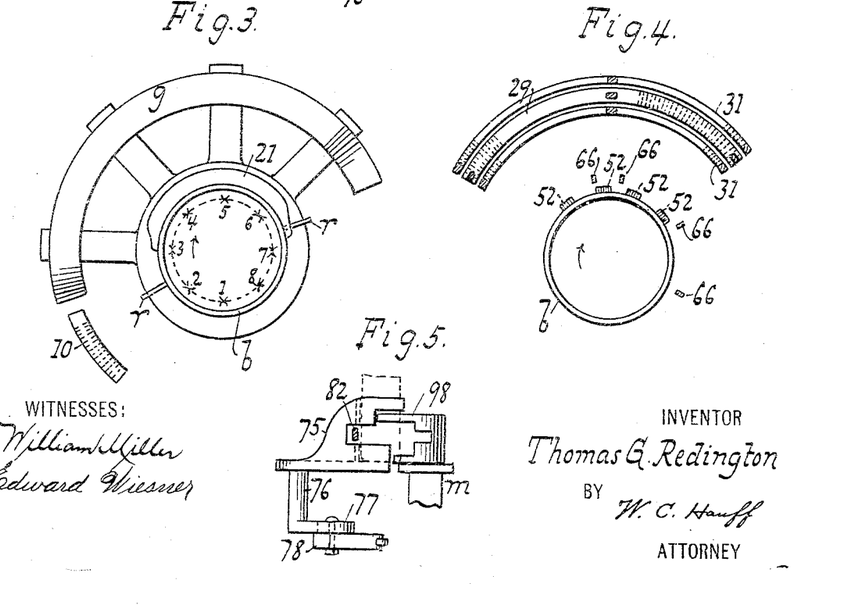
Fig. 3 shows details such as the track or face for clamping the bottle neck, trips for locking and unlocking the bottle table, and incline or track for adjusting the height of bottle top.
Fig. 4 shows tracks for lowering the capping die and filling head sections, and trips for actuating a cock or valve.
Fig. 5 shows mechanism moving a bottle from the bottle conveyer to the bottle seat or bottle table.
Figures 6, 7, 8:
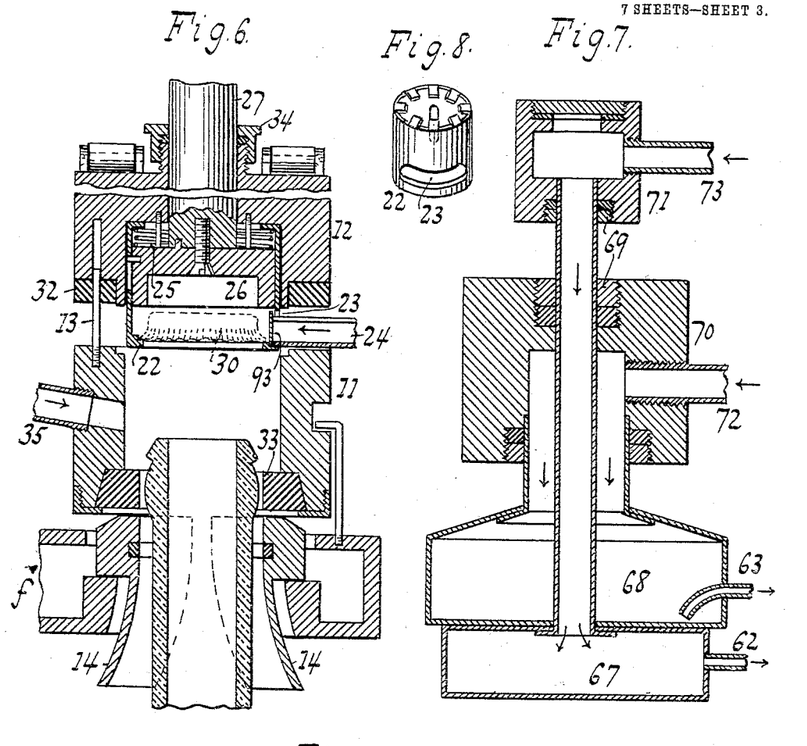
Fig. 6 is a sectional view of the filling head.
Fig. 7 shows stuffing boxes at gas and liquid pipes.
Fig. 8 shows a cap holder.
Figure 22:
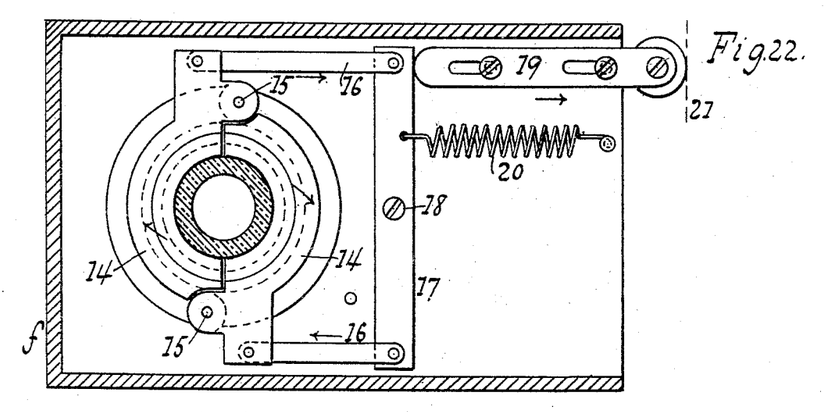
Fig. 22 shows a bottle clamp closed and is a sectional view of Fig. 23 as indicated by section line.
Figure 23:
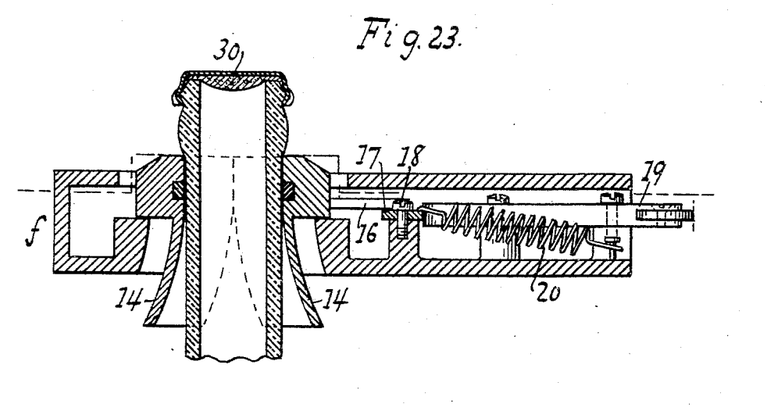
Fig. 23 is a vertical section of the clamp shown in Fig. 22.
Figure 24:
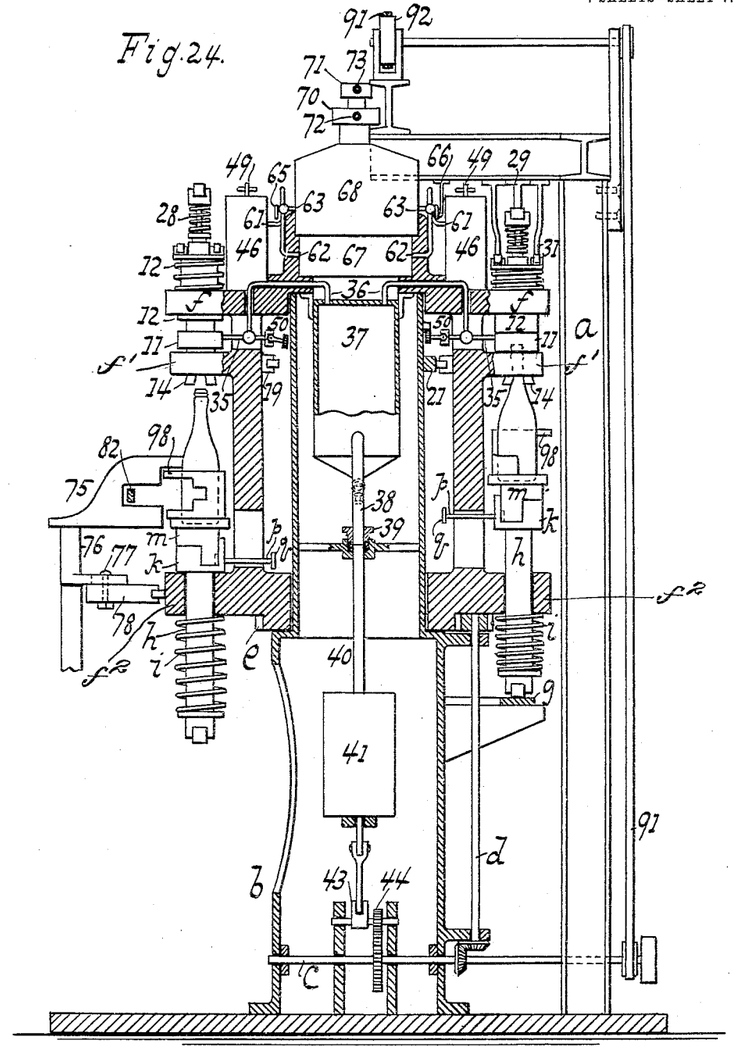
Fig. 24 is a vertical central section of Fig. 1.

If a bottle should have its mouth or top above a certain level such bottle as it is carried under an incline on the under face of track 10 Figs. 2 and 3 at the upper part of the device is depressed by part $m$ being suitably slid on part $k$ after which the clamp $o$ locks the bottle table at the required level. When the bottle table is locked this table is raised by plunger $h$ at the right moment coming to an elevation of track $g$ so as to cause the head of the bottle to enter the filling head made in two sections 11 and 12 and held by the support $f^1$ and sliding or movable to and from one another and having guide pins 13 (Fig. 6). As the bottle mouth enters the filling head the clamp 14 clasps the neck of the bottle. This clamp comprises two jaws each fulcrumed on a fixed pivot 15. (Fig. 22). The tail part of each jaw is pivoted to a link 16 connected respectively to opposite parts of a lever 17 fulcrumed at 18.

A slide 19 at suitable times presses against one end of lever 17 and swings the links 16 in opposite directions to close the jaws or clamp 14, and the spring 20 on the release of the cam opens the clamp by swinging lever 17 in the opposite direction. The slide 19 is actuated at suitable times by a cam or track 21 Figs. 1 and 3 about the central column or riser $b$ of the device. The clamp 14 is of sufficient extent and of flaring shape to grasp the neck and center the bottle, said clamp grasping the bottle neck to some extent.

The filling head above mentioned or its upper section contains a cap holder 22 Fig. 6 which has a slit or passage 23 Fig. 8 to receive a cap from chute 24 as the filling head is carried past the chute by the moving bracket or table $f$. This cap holder 22 rests on a spring 25 Fig. 6 which spring rests on a capping die 26. This capping die is connected to a plunger 27 normally raised or held up by a spring 28 Fig. 1 and depressed at suitable intervals as the rotating bracket $f$ carries the plunger 27 under a chamfer or incline 29 Figs. 1, 2 and 4. As the capping die comes to the cap 30 the cap becomes steadied or seated in said die. The die 26 can be prevented by stop pins from coming so close to the head section 12 as to crush or deform spring 25 Fig. 6. As the filling head brings its upper section or the antifriction rollers thereon under the inclined track 31 Figs. 1, 2 and 4 said filling head having now passed by the fixed cap chute 24 has its section 12 pressed to section 11 and by packing 32 between the sections and by the packing 33 between the section 11 and clamp 14 now hugging the bottle neck an air tight inclosure or space is formed about the bottle mouth. The plunger 27 can pass through a stuffing box 34 Fig. 6.

Figure 1:
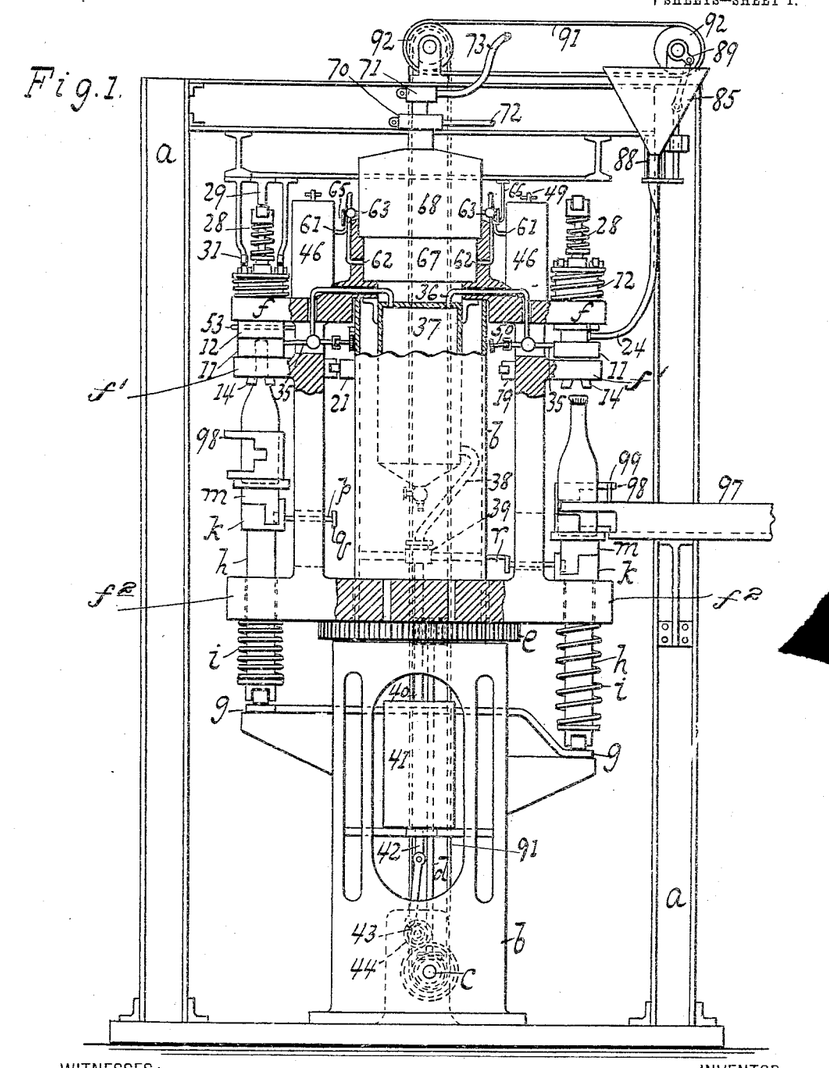
Figure 1 is a front elevation of a machine embodying this invention, parts being sectioned away.
Figures 9, 10:
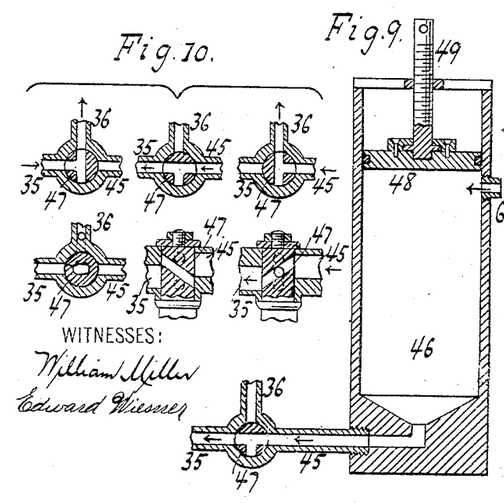
Fig. 9 shows the quantity gage.
Fig. 10 shows various positions of the valve leading from the quantity gage.

The filling head is shown with a pipe 35 which can be made to communicate with a pipe 36 Figs. 9 and 10 leading to a vacuum tank 37 Fig. 1 having exhaust tube 38. As the tank 37 rotates with bracket $f$ the tube 38 has a stuffing box connection at 39 with tube 40 of exhaust pump 41 whose plunger or piston 42 is actuated by crank pin or connection 43 rotated by main shaft $c$ or by a gear connection 44 with such shaft. This pipe 35 also by branch 45 (Figs. 9 and 10) can be put into communication with quantity gage 46 Figs. 1 and 2. One such gage is shown for each bracket arm $f$. The branches 35, 36 and 45 are put into communication at various times by a three way cock 47 shown in various positions by the series of adjustments shown in Fig. 10. The valve shown in the lower series of Fig. 10 is the same valve as the valve shown in the upper series of said Fig. 10. Said series showing six views of one and the same valve is inserted to aid the description of the movements of this valve or three-way cock 47. This valve is in form of a plug valve, and the view of the valve shown in Fig. 9 and in the first four illustrations of the series in Fig. 10 are all transverse sectional views of said valve, while the fifth and sixth views in the lower series show the sections along the axis or longer dimension of the plug. In the first of said positions the valve has been turned to open the passage from 35 to 36 to exhaust air from the bottle. Such vacuum in the bottle among other things aids in the preservation of liquids such as beer and other fluids. In the second position Fig. 10 the valve 47 allows beer or liquid from gage 46 to flow through branches 45 and 35 to charge the bottle. In the third position of valve 47 the passage 36 and branch 45 communicate so as to exhaust or create a vacuum in the gage 46. The fourth position of valve 47 is illustrated by the fourth and fifth of the series of illustrations of Fig. 10 and shows that the branches 35 and 45 are not in line. In other words, the axis or central line of pipe 35 does not coincide with the axis of pipe 45. The said fifth illustration also shows that the passage which is bored entirely through the valve as shown by the fifth and sixth of the series of illustrations in Fig. 10, runs at an incline to the axis of the valve plug so as to separate or be out of communication with the passages 35 and 45 in one position as seen in said fifth illustration while if given a suitable turn as seen in the second and sixth of the series Fig. 10 said valve plug 47 allows flow from passage 45 to passage 35 in which case as seen in Fig. 9 the contents from gage 46 run into the bottle. The short or radial passage through plug 47 never registers with branch 36 but said branch having two mouths as indisated in the last two of the series Fig. 10 by dotted circles said short branch while registering with branches 35 and 45 will never register with either of the mouths of branch 36.

As the gage has a plate or piston 48 Fig. 9 in form of a packed or tight fitting disk forming an adjustable head which can be set by turning screw 49 said gage can have its capacity regulated to an accurate charge for the several bottles or series or sizes of bottles passing through the machine.

Figure 19:
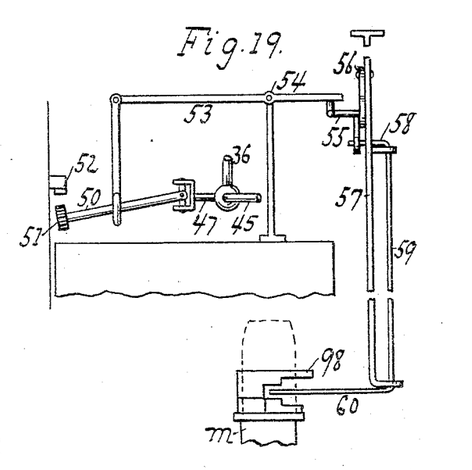
Fig. 19 shows details of a cock controller.
Figure 20:
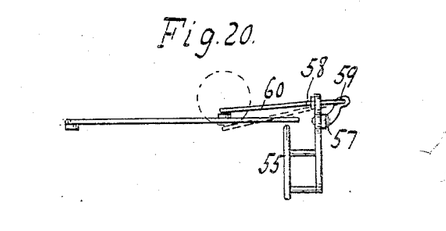
Fig. 20 is a plan view of Fig. 19.

The means for operating or turning valve plug 47 comprise a shaft 50 Figs. 1 and 19 connected to valve plug or stem 47 by a universal joint. This shaft or rod 50 has a pinion 51 and is moved at certain times to swing its pinion into mesh with trips or racks 52 Figs. 4 and 19. Four trips 52 are shown to set the valve 47 to the various positions explained in Fig. 10.

Figure 21:
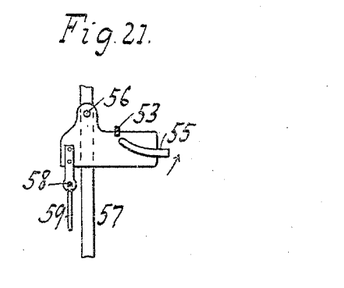
Fig. 21 shows details of Fig. 20.

The means for establishing temporary engagement of a trip 52 by gear 51 are shown in form of a lever 53 Fig. 19 fulcrumed at 54. One arm of the lever connects by a suitable link with arm 50 and the other arm of said lever 53 at suitable moments is actuated or depressed by a cam or inclined face piece 55 Fig. 21 pivoted at 56 to a support or standard 57. This swinging piece 55 is engaged by an arm 58 of a long pivot 59 whose arm 60 is in the path of the bottles being moved along by the machine or its traveling brackets. As a bottle moves arm 60 the arm 58 is caused to swing the inclined face 55 to cause its higher end to rise above the top face or edge of lever 53. Such lever passing under face 55 is depressed at one end and the other lever end or arm lifts gear 51 to one of the trips or short racks 52 to turn the valve. As the lever 53 passes along and leaves the face 55 said lever being freed allows gear 51 to drop clear from trip 52.

Figure 11:
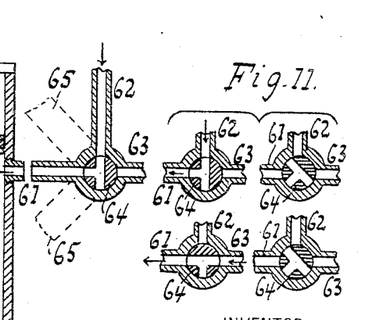
Fig. 11 shows various positions of the valve leading to the quantity gage.

The gage 46 is supplied or charged by pipe 61 Figs. 1 and 9. A branch 62 connects with a gas supply and the branch 63 with liquid supply. A three way valve 64 at suitable times brings branch 61 into communication with branch 62 and with branch 63 or shuts off the passages as called for. In Fig. 11 are shown the various positions of valve 64. This valve has its arm 65 as the gage travels along brought into contact with trips 66 Figs. 1 and 4 fixed to or depending from a suitable part of the supporting frame $a$.

The gas supply and liquid supply above mentioned are shown in form of tanks 67 and 68. The liquid or beer tank and gas tank have their necks or entrance tubes rotating in suitable stuffing boxes or packings 69 in fixed heads 70 and 71 communicating by pipes 72 and 73 with a liquid supply such as a beer keg or other vessel and with a source of gas. The tanks 67 and 68 may be secured to one another to rotate in unison, and with traveling parts of the machine. The tank 67 is intended for gas and the tank 68 for liquid.

The bottles could be placed into the machine or removed by hand but both operations can be performed automatically. A bottle conveyer or belt 74 Fig. 2 slides or moves the bottles into position on an arm or carrier 75 pivoted at 76 and having an arm 77 Figs. 2 and 5 connected by pin and slot connection to a lever 78 fulcrumed at 79. The traveling brackets $f$ have each suitable cam shaped or ridge like outer edges to swing lever 78. A retracting spring 80 normally moves lever 78 to its starting point or to stop 81 for arm 75 to register with the conveyer or belt 74.

When lever 78 has swung arm 75 to register with a bracket $f$ the bottle is moved from the arm onto the bracket by a lever 82 Figs. 2 and 5 fulcrumed at 83 and actuated by said ridge parts of brackets $f$ against the action of its retracting spring 84 to sweep the bottle off the arm 75 onto the bracket or into the machine.

Figure 12:
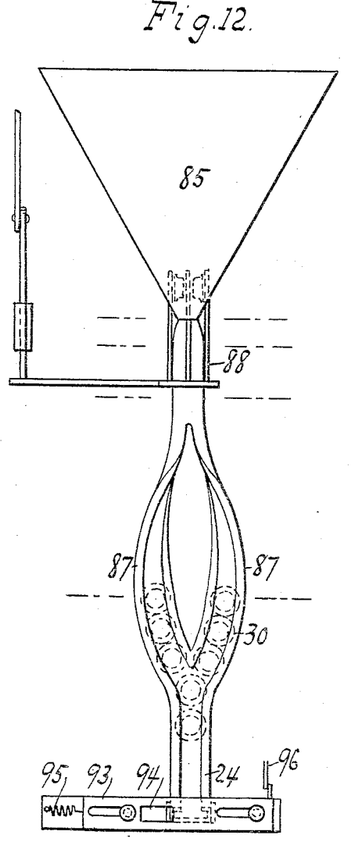
Fig. 12 shows a hopper for caps or closures.
Figure 13:
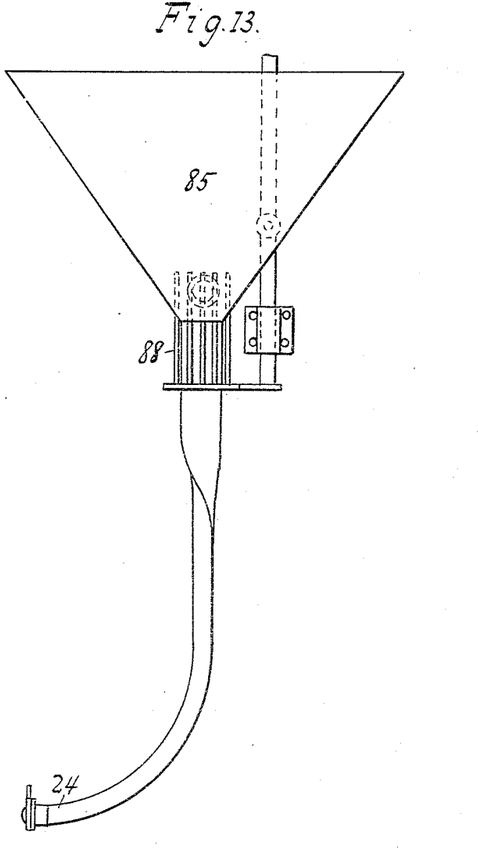
Fig. 13 is a view at right angle to Fig. 12.
Figure 14:
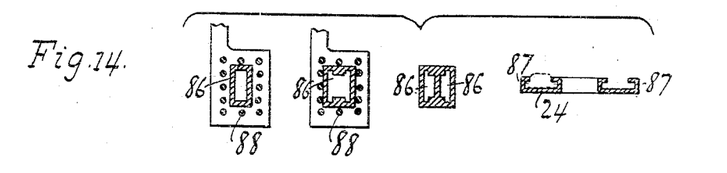
Fig. 14 is a set of vertical views their lines of section being indicated by dotted lines Fig. 12.
Figure 15:
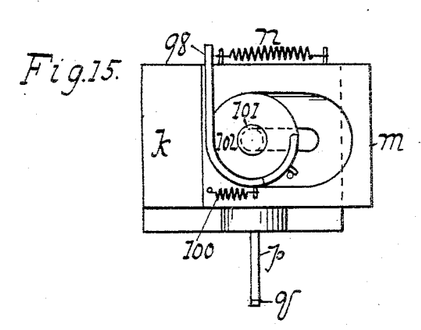
Fig. 15 is a plan view of an adjustable bottle table.

The cap chute 24 is supplied from a supply in hopper 85 Figs. 12 to 14 having in the particular construction shown oppositely facing exists 86 of cap ($\sqcap$) shape or so formed in cross section as to correspond to a cap. This chute as seen has branches 87 whose quarter turn brings caps respectively facing in opposite directions into position to leave the chute 24 in position to be applied to the bottle. The supply in the hopper is constantly agitated by suitable means. The agitator shown comprises fingers or pushers 88 reciprocated by eccentric or crank pin 89 Fig. 1 actuated by belt and pulley connections 91 and 92 from main shaft. The chute has a cut off to allow but one cap to pass to the holder at a time. This cut off consists of a slide 93 Figs. 6 and 12, having a slit or mouth 94 of sufficient size to allow a cap to pass when the mouth registers with the chute. A spring 95 holds or returns the shut off to closing position and the finger 96 on a suitable moving part of the mechanism at suitable moments moves the slide to open the chute for a passage of one cap or crown, when the slide is released and again snapped shut to cut off the following crowns. The finger 96 can be carried by bracket $f$. A bottle take off 97 with suitably curved entrance mouth and with a curved fixed arm extending from same causes the filled bottle to slide off from the bottle seat on table $m$. A rim or swinging arm 98 Fig. 15 is moved by a trip 99 Figs. 1 and 2 and a returning spring 100 Figs. 15, 16 and 17. The bottle seat being thus suitably rotated the bottle can slide onto the track or take off 97. The rim 98 swivels with the pin or stud 101 of the pin and slot connection uniting the parts $m$ $k$. The rim 98 forms part of a bottle seat 102 which seat can swivel with pin 101 but cannot move in any other direction except vertically up and down so as to always remain axially under the filling head. The parts 98 and 102 can be formed of several pieces or integral as seen fit. The parts $k$ and $m$ might together be considered as forming a bottle support, and part 102 with rim 98 as a swiveling part of the bottle seat.

Connected to arm 75 (Fig. 2) is a segment 103 and as the arm 75 moves to a bracket the segment 103 comes to position to close the outlet of feed or conveyer 74 so that the bottles on the conveyer cannot pass or fall off while the arm 75 is delivering a bottle to a bracket.

The operation is as follows. The machine rotates in the direction of the arrow shown about the center in Fig. 3. A preliminary rotation of the device will fill the gage or gages and supply a cap to the filling head or heads. To aid in the description eight points of travel are marked in Fig. 3 by numbers 1 to 8. The cycle 1 to 8 might be set forth as follows. Bottle cap is first placed in filling head. Bottle is put into bottle carrier 75 by belt conveyer 74. Machine is started and bracket at point 2 operates lever 78 and places bottle opposite bottle table at point 1. Bracket at point 8 operates lever and forces bottle into bottle table guard at point 1. Bottle carrier and bottle forcing lever then return to normal position by action of springs 80 and 84. Bottle travels to bottle top adjusting incline 10 and when the right height, bottle table is locked by lock $o$. Table is next raised by track $g$ and head of bottle enters filling head. Neck is now clamped. Filling head pushed down making tight joint, air is pumped out of bottle and beer run into bottle (capping die in meantime has been pushed part way down to make space in filling head small, and also to keep cap from being raised by force of beer rushing in.) Capping die is now forced down, and caps bottle. Capping die is now raised, filling head is raised, bottle neck clamps are released, bottle table drops and is unlocked. Fresh cap is put into cap holder, and bottle is automatically removed at point 8. As soon as beer or liquid has started to run into bottle, upper 3 way cock 64 is turned, admitting gas to quantity gage, and by its top pressure holding down the beer foam, as beer enters bottle. Gas is now turned off, air pumped from gage by lower 3 way cock 47, latter closed, upper 3 way cock opened, beer run into gage, and upper 3 way cock closed. Lower 3 way cock will not operate unless its gear is raised into engagement with rack, by 3 way cock controller. Upper 3 way cock after gage is full can be operated indiscriminately by trips without varying conditions much, so no 3 way valve controller is needed for this. The vacuum pump is kept running all the time as is cap agitator. Machine can be run by electric motor, on frame or by other power. The bottle is in the machine from point 1 to point 8 inclusive. At point 1 and point 8 bottle table is low. Bottle adjusted and locked approximately at point $2\frac{1}{2}$ bottle table low. Bottle table starts to rise approximately at $2\frac{2}{3}$ and is raised at 3, and bottle table now remains raised for a number of steps as now stated. Bottle neck clamps start to operate at about 3 and are clamped at about $3\frac{1}{2}$, bottle table raised. Filling head starts to lower at about $3\frac{1}{2}$ and is lowered at about 4, bottle table raised. Capping die starts to lower at about $3\frac{1}{2}$, bottle table raised. Capping die comes down part way onto cap at about 4, bottle table raised. Air is pumped out and beer run in at about 4 to $5\frac{1}{2}$ inclusive, bottle table raised. Capping die starts to cap at about 5 and finishes at about 6, bottle table raised. Filling head, bottle clamps and capping die released at about $6\frac{1}{4}$, bottle table low. Table has dropped between about 6 and $6\frac{1}{4}$ and is unlocked at $6\frac{1}{4}$, bottle table low. Cap is put on anywhere between $6\frac{1}{4}$ and $7\frac{3}{4}$, bottle table low. Bottle removed by preference automatically at 8, bottle table low.

Workings of 3 way cocks contemporaneous with above are explained in cycle of operations just preceding.

What I claim is:—

1. In a bottle filling and capping machine, a conveyer, a pivoted arm for receiving a bottle from the conveyer, a lever for swinging the arm about its pivot to move the same to and from the conveyer, a second lever to move the bottle from the arm, a bottle receiving table, and cams on the table for actuating the levers.

2. In a bottle filling and capping machine, a conveyer, a bottle receiving table, a bottle carrying arm for moving the bottle from the conveyer to the table, a lever for moving the bottle carrying arm, and a bottle removing lever for carrying the bottle from the arm onto the table.

3. In a bottle filling and capping machine, a series of rotating brackets forming a bottle receiving table, a bottle carrying arm and lever for bringing a bottle to the table, a vertically reciprocating rod carried by the traveling table, and a sliding table carried by the rod.

4. In a bottle filling and capping machine, a bottle table, an inclined way for bringing the bottle to a certain level, a bottle adjusting incline, a filling head and capping die, means for causing the head to clasp a bottle mouth, means for charging a bottle, and means for causing the die to force a cap thereon.

5. In a bottle filling and capping machine, a traveling table, a slidable bottle supporting rod with bottle rest carried by the table, an inclined way and adjusting incline located opposite one another for bringing a bottle on the slidable rod to the desired level, means for locking the rest at such level, a filling head and capping die, means for causing the head to charge the bottle, and means for causing the capping die to apply a cap to a bottle.

6. In a bottle filling and capping machine, a conveyer, a pivoted or swinging carrier, a lever for actuating the carrier, a table or bracket for actuating the lever, a forcing lever for moving the bottle off the conveyer onto the table, means for adjusting the height of the bottle on the table, means for filling and capping the bottle, and means for removing the bottle from the table.

7. In a bottle filling and capping machine, a traveling table, an adjustable bottle supporting rod carried by said table, an inclined bottle supporting rest supported on the rod, a filling head located above the bottle supporting rod, and an incline above the filling head for moving said filling head toward the bottle supporting rod.

8. In a bottle filling and capping machine, a traveling table, an adjustable bottle supporting rest carried by the table, and a lock and returning spring for the bottle supporting rest.

9. In a bottle filling and capping machine, a traveling table, an adjustable bottle supporting rest, a lock for the rest, and means for opening and closing said lock.

10. In a bottle filling and capping machine, a traveling table, an adjustable bottle supporting rest, a lock for the latter, and trips for locking and unlocking.

11. In a bottle filling and capping machine, a traveling table, an adjustable bottle rest, a lock for the rest, and trips for locking and unlocking, said lock having an arm made to contact with the trips as the table carries the lock to the trips.

12. In a bottle filling and capping machine, a table, a filling head, an exhausting tube or connection, a filling tube, and a cap applying device combined with a common valve for alternately opening and closing the exhaust and filling tube, said valve having several ways for communicating respectively with the exhaust tube and the filling tube.

13. In a bottle filling and capping machine, a table with rising and falling foot, a bottle rest adjustable on the foot, a filling head, and oppositely located inclines for adjusting the rest and foot.

14. In a bottling machine, a bracket with rising and falling support, an inclined way for moving the support, and a filling head into which the bottle mouth is caused to enter by said support, said support comprising inclined faced pieces and means for sliding one of the pieces to set the bottle prior to its being moved into the filling head.

15. In a bottling machine, a bracket with rising and falling support, means for raising the support, a filling head and a leveling track or incline, said support comprising sections with inclined faces caused to slide upon one another to be adjusted by the track, a clamp or lock for causing the sections to be fixed to one another, and a trip for actuating the clamp.

16. In a bottling machine, a bottle clamp comprising jaws, links connected to the jaws, a lever to opposite arms of which the links are connected, an actuating slide for the lever, and a track against which the slide is made to sit to be actuated thereby.

17. A filling head comprising sections with packing and made to close together air tight, a cap holder and capping die in said head, a cap chute and fluid conduit leading into the head, and means for actuating the head sections and die.

18. A filling head comprising sections, a cap holder and capping die in said head, a cap chute and fluid conduit leading into the head, and means for actuating the head sections and die, said head sections having packing to close air tight when brought together.

19. A filling head comprising sections with packing, a cam or incline for closing the sections, a capping die in the head, a cam or the like for actuating the die, a cap holder and feed for supplying the cap holder.

20. A filling head comprising sections with packing, a cam or incline for closing the sections, a capping die in the head, a cam or the like for actuating the die, a cap holder, and a feed for supplying the cap holder, said holder being suspended by means of a spring.

21. A filling head comprising sections with packing, a cam or incline for closing the sections, a capping die in the head, a cam or the like for actuating the die, a cap holder, and a feed for supplying the cap holder, said feed or chute being made to pass into the open head when its sections are separated.

22. A filling head comprising sections with packing, a cam or incline for closing the sections, a capping die in the head, a cam or the like for actuating the die, a cap holder, and a feed for supplying the cap holder, said head having a conduit for liquid or beverage.

23. A filling head comprising sections with packing, a cam or incline for closing the sections, a capping die in the head, a cam or the like for actuating the die, a cap holder and a feed for supplying the cap holder, said feed or chute being made to pass into the open head when its sections are separated, and a conduit made to enter the lower head section.

24. A filling head comprising upper and lower sections with packing so that the lower sections can tightly clasp a bottle and that the two sections can be tightly closed together, a guide for the sections, a conduit leading into the lower section, a cap feed adapted to pass between the sections, a capping die in the head, a cap holder loosely connected to the die, and a spring seated on the die and made to support the holder.

25. In a filling machine, a filling head having a conduit, a vacuum tank with which the conduit communicates, and a vacuum pump for the tank, said head and tank being mounted on a traveling support, and the tank and pump having a connecting conduit or pipe with stuffing box to form an air tight joint.

26. In a filling machine, a filling head and quantity gage with liquid and gas tanks all made to travel together, stationary liquid and gas supply tubes having stuffing box connections with the liquid and gas tanks respectively, and a vacuum tank connected to the filling head.

27. In a filling machine, a liquid tank, a gas tank, and a vacuum tank all made to revolve together, supply tubes and a vacuum pump having stuffing box connections with the respective tanks, a quantity gage having a conduit connection with the liquid tank, and a filling head having a conduit connection with the quantity gage and with the vacuum tank.

28. A conduit having branches and a three way cock, one of the ways always being out of line with the conduit, and the cock having a diametrical inclined way so as to register with a branch and the conduit in but one position.

29. A conduit having branches and a three way cock, one of the ways being out of line with the conduit, and the cock having a diametrical inclined bore so as to register with the branch and conduit in but one position and to close or to be out of register with said branch when given a suitable turn.

30. In a filling machine, a liquid tank, a gas tank, a vacuum tank, a gage and a filling head all made to travel together, conduit connections between the gage and the liquid and gas tanks, a valve having passages for said conduit connections, trips for the valve, conduit connections between the filling head and the gage and vacuum tank, a valve having passages for the last named conduit connections, an actuating gear loosely connected to the last named valve, and means for moving said gear into and out of actuating position.

31. A valve operating mechanism comprising a pinion or gear shaft loosely or swingingly connected to the valve, a trip, and means for temporarily lifting or moving the pinion or teeth to the trip.

32. A valve operating mechanism comprising a valve actuating gear shaft, a trip or gear for the shaft, a lever for moving the shaft to the trip, an inclined track or way for tilting the lever, and an arm for moving the inclined way into position.

33. In a filling machine, a traveling bracket, a gage with a valve, an actuating stem for the valve, a trip for the stem, a lever for moving the stem to the trip, a guide way for swinging the lever, and an arm actuated by the article on the bracket to bring the guide into operative position.

34. In a filling machine, a conduit and branches leading to the conduit, a valve for the branches and conduit, an actuating stem loosely connected to the valve, a series of fixed trips past which the valve is moved, a lever for moving the stem to the trips, a guide swinging on a fixed point, and an arm for moving the guide into the path of the lever to cause the latter to bring the stem to the trips.

35. A quantity gage mounted on a traveling support and having a supply pipe with gas and liquid branches, gas and liquid tubes made to travel with the quantity gage and communicating respectively with the branches, a valve for the pipe and branches, and a stationary trip placed in the path of the valve to actuate the latter.

36. A quantity gage having a supply pipe with branches, gas and liquid tanks communicating with the branches, a valve for the pipe and branches, and a trip for the valve, said gage and tanks being made to travel and the trip being fixed in the path of the valve.

37. In a filling machine, a stationary supporting frame, a traveling quantity gage having a supply pipe with branches, traveling gas and liquid tanks communicating with the branches, a valve for the pipe and branches, and a trip for the valve, said gage and tanks being made to travel, and the trip being secured to the stationary frame so as to be in the path of the valve.

38. In a filling machine, a traveling gas tank with superposed traveling liquid tank, concentric entrance tubes respectively fixed to said tanks, stationary stuffing boxes with supply conduits for supplying the tubes, a gage having a valved conduit connection with the liquid and gas tanks, a vacuum tank below the first named tanks, a filling head, valved conduit connections between the filling head, the gage, and the vacuum tank, and trips for automatically actuating the several valves.

39. A bottle feed comprising an arm, a lever for swinging the arm, a bracket having an edge or face for moving the lever, and a second bracket and second lever actuated by the second bracket for moving the bottle off the arm.

40. A bottle filling machine comprising a series of traveling brackets with cam faces, a pivotal arm, a lever for swinging the arm to one of the brackets, and a second lever made to move the bottle off the arm onto a bracket, said levers being actuated by the cam faces.

41. In a bottling machine, a take off comprising a rim, a trip and spring for actuating the rim, and a track having its entrance in the path of said rim.

42. A bottle support comprising members with inclined faces one of which is made to slide on the other, and a bottle seat mounted on the sliding member and connected by a pivot or swivel pin to the non-sliding member.

43. A valve plug comprising a diametrical inclined passage, a radial passage combined with three tube branches, two of which are out of line with one another to communicate at certain times with the inclined passage, and the third tube having a forked outlet to be out of register with the radial passage.

44. A bottle feed comprising an arm or carrier, a lever for swinging the arm, brackets having edges or faces for moving the lever, and a second lever actuated by a bracket for moving a bottle off the arm onto a preceding or adjacent bracket.

45. A filling and capping machine comprising a filling head made in sections, means for closing the sections together air tight, bottle clasping jaws with means for closing the jaws air tight about the bottle mouth, means for exhausting air from the filling head and bottle, and means for closing the bottle while in the filling head.

46. A bottle filling machine having a conveyer, a bracket, an arm for transferring a bottle from the conveyer to the bracket, and a segment moving or swinging with the arm to close the conveyer while the arm is swinging to or from the bracket.

47. In a bottle filling and capping machine, a foot for supporting a bottle, a valve operating mechanism comprising a pinion or gear shaft loosely or swingingly connected to the valve, and a trip, said bottle supporting foot being made to move a bottle to position to temporarily lift or move the pinion or teeth to the trip.

In testimony whereof I have hereunto set my hand in the presence of two subscribing witnesses.

THOMAS G. REDINGTON.

Witnesses:
    EDWARD WIESNER,
    CHRISTIAN ALMSTEAD.